A. WEISS.
MACHINE FOR SHARPENING BAND SAW BLADES.
APPLICATION FILED JUNE 17, 1916.
1,259,692.
Patented Mar. 19, 1918.
4 SHEETS—SHEET 2.
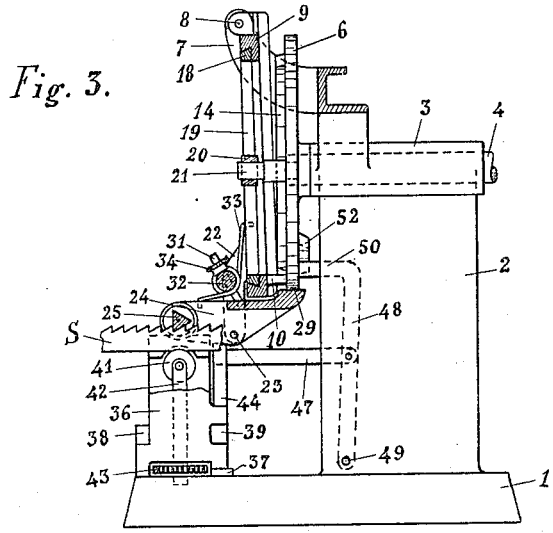
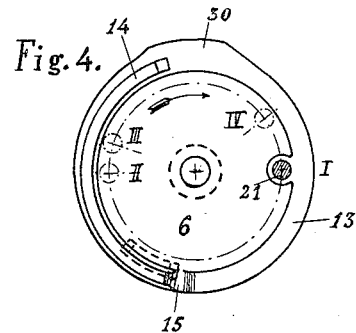
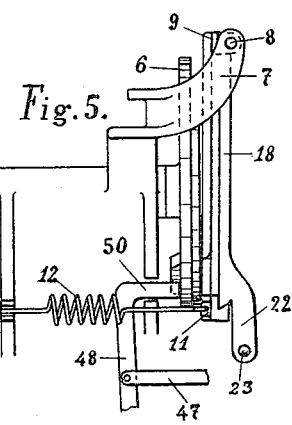
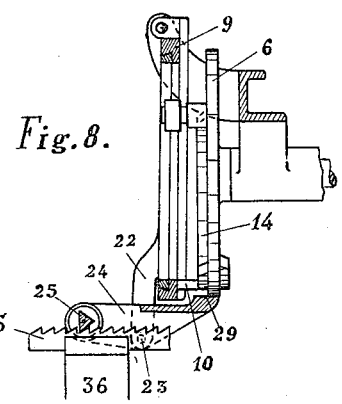
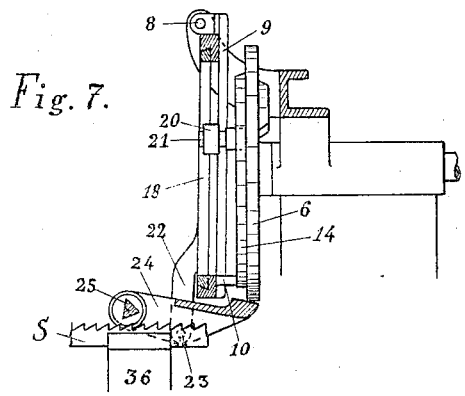
INVENTOR:
Alfred Weiss
By Wm Wallace White
ATTY.

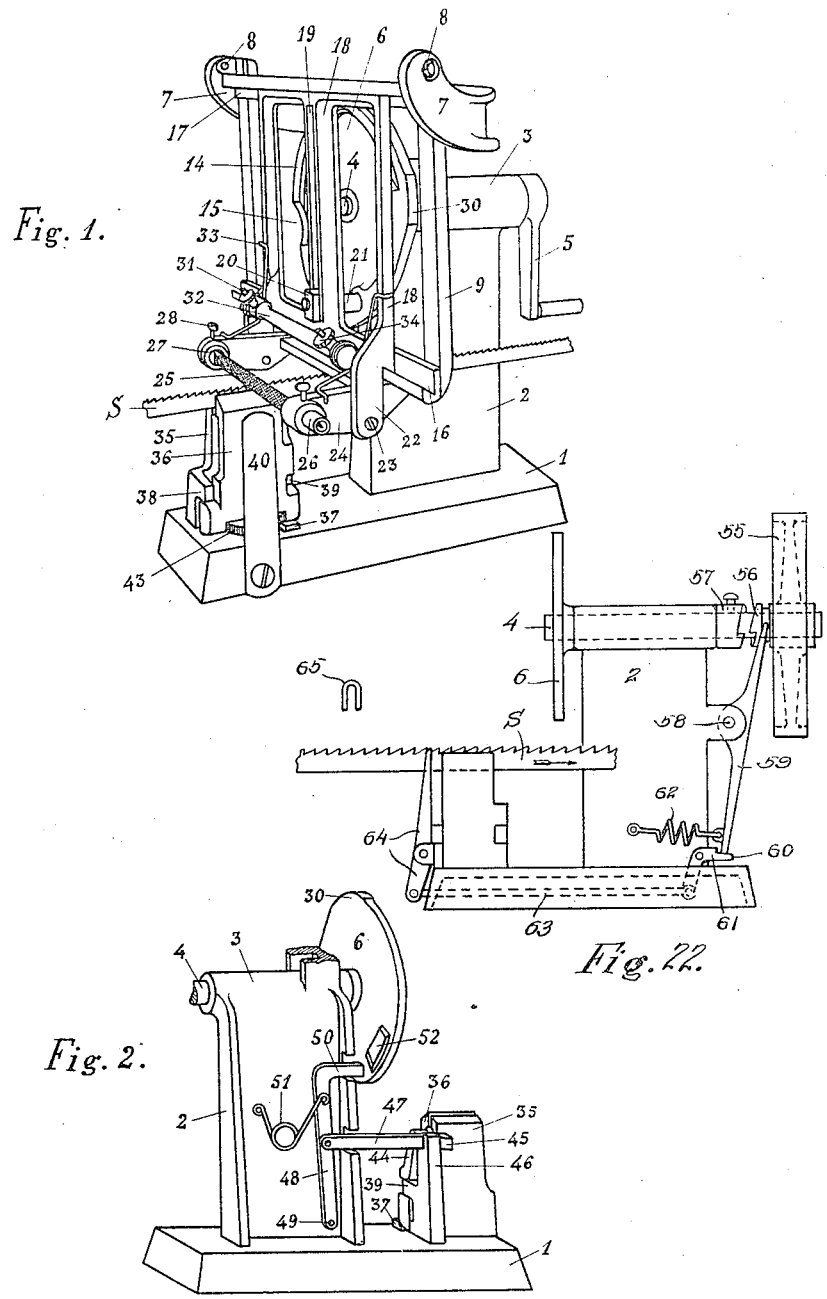

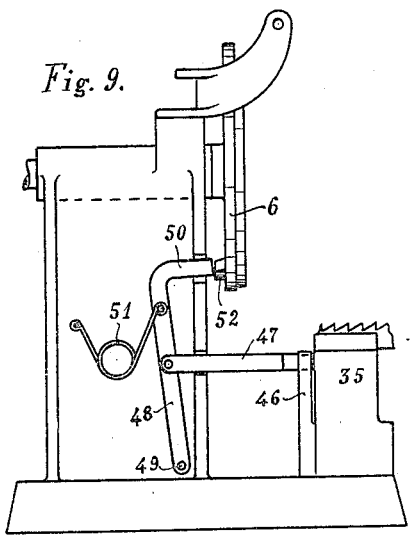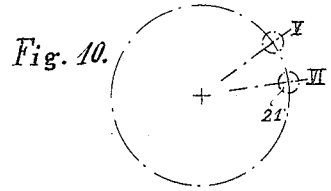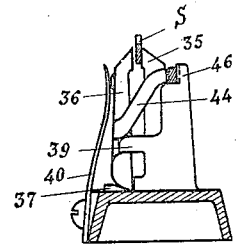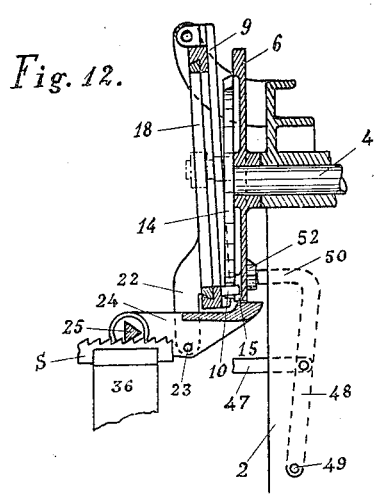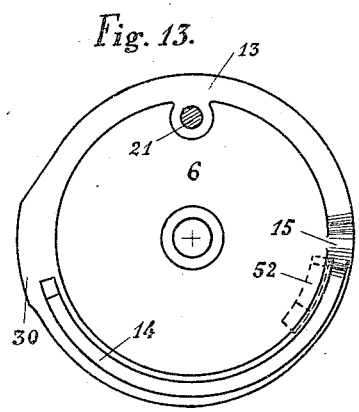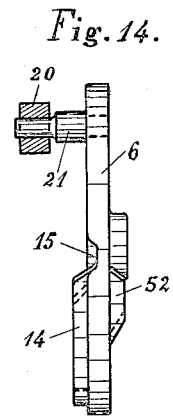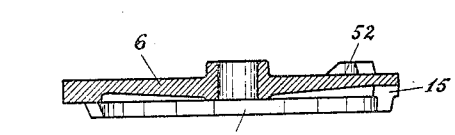

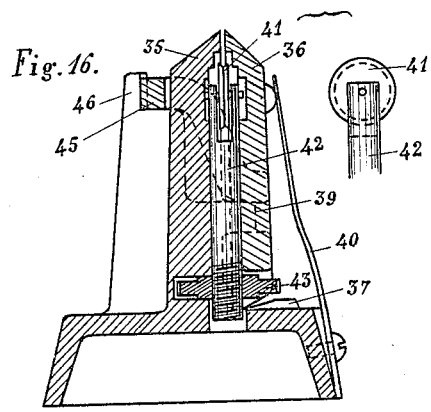
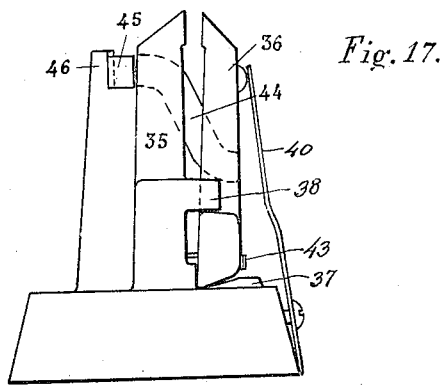
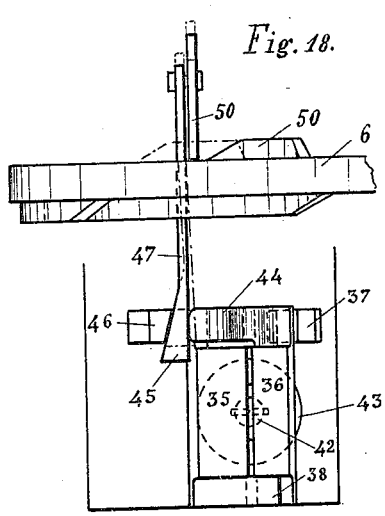
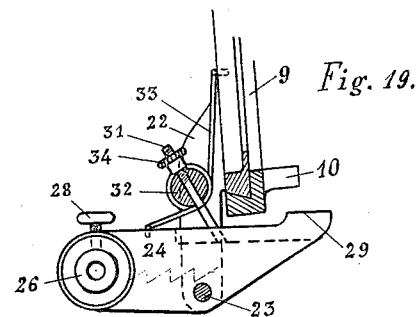
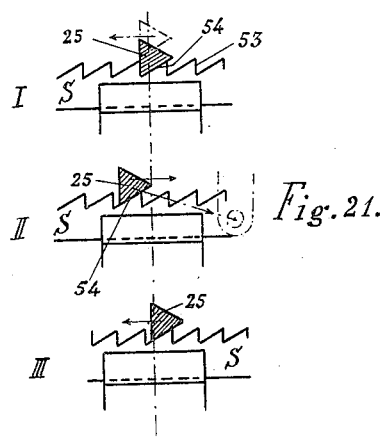
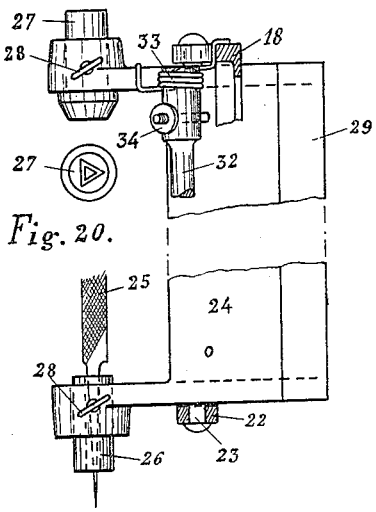

UNITED STATES PATENT OFFICE.

ALFRED WEISS, OF MAMMERN, SWITZERLAND, ASSIGNOR TO KARL ZIMMERLIN, OF AARAU, SWITZERLAND.

MACHINE FOR SHARPENING BAND-SAW BLADES.

1,259,692.  Specification of Letters Patent.  Patented Mar. 19, 1918.

Application filed June 17, 1916. Serial No. 104,340.

*To all whom it may concern:*

Be it known that I, ALFRED WEISS, citizen of the Republic of Switzerland, residing at Mammern, Canton of Thurgan, Switzerland, have invented new and useful Improvements in Machines for Sharpening Band-Saw Blades, of which the following is a specification.

My invention relates to band-saw sharpening machines, and has for its object the creation of a machine in which, with extreme simplicity of construction, the sharpening is done in such a way that each saw-tooth is sharpened first on its breast-edge (front edge) and then on its back-edge. This results in a better sharpening than the reversed process practised by the machines heretofore known.

The invention is made clear by the aid of the annexed drawings, in which:

Figure 1 is a perspective view of the machine as seen from one side;

Fig. 2 is a partial perspective view of the opposite side;

Fig. 3 is a vertical section of the machine, representing the file and its operating mechanism at the beginning of the working stroke;

Fig. 4 is a front elevation of the rotary cam plate which actuates the operating parts, the same being shown in the position corresponding to Fig. 3;

Fig. 5 is a side elevation of part of the machine in this position, looking in the opposite direction to Fig. 3;

Fig. 6 is a section similar to Fig. 3, showing the position of the parts after completion of the working stroke (at the beginning of the return stroke) of the file;

Fig. 7 is a section similar to Fig. 3, showing the file pushed forward for the feeding of the saw-blade;

Fig. 8 is a section similar to Fig. 3, showing the file in its position just before starting the feeding;

Fig. 9 is an elevation of the opposite machine-side during the feeding;

Fig. 10 is a diagram showing certain respective positions of the rotary cam plate;

Fig. 11 is a cross-sectional view of the saw-clamping device, showing its position during the feeding;

Fig. 12 is a section similar to Fig. 3, showing the position of the parts in a certain phase of the feeding;

Figs. 13, 14 and 15 show the rotary cam plate which actuates the operating parts, on a larger scale, in front elevation, side elevation, and axial section, respectively;

Figs. 16, 17 and 18 show the clamping device for the saw-blade, on a larger scale, in transverse vertical section, front elevation and top plan view, respectively;

Figs. 19 and 20, show the file-holder, on a larger scale, in side elevation and fragmentary top plan view, respectively;

Fig. 21 is a diagrammatic view showing various phases of the feeding process;

Fig. 22 shows a modification of the machine for power drive in side elevation.

Referring to the drawings by reference characters, the numeral 1 designates the foundation plate of the machine on which is arranged an upright 2, which on top is formed into a bearing 3. In this is placed a shaft 4, to one end of which is attached the hand-crank 5 for use in rotating it. Onto the opposite end of the shaft is keyed a rotary cam plate or actuating member 6, from which emanate all the movements of the machine.

Above on the upright 2 are arranged arms 7 with pintles 8 from which a frame 9 capable of swinging back and forth is suspended. On the rear side of this frame, which faces the cam plate, there is provided at its bottom, a nose 10 (Figs. 3 and 19) and an eye 11 (Fig. 5) gripped by a tension-spring 12 which presses the nose 10 onto the front side of the cam plate. This front side (Figs. 13 to 15) presents an elevated edge 13 from which furthermore protrudes axially an arcuate rib 14 presenting a front cam surface. On one end of this rib the elevated edge of the cam is interrupted, so that there is formed a depression 15. On this path slides the nose 10 of the frame, which thus obtains its oscillatory motion. The spring 12 can be unhooked at its rear end, so that the pendulating frame 9 together with the slide 18 arranged therein can be thrown over backward, in order to thus expose the parts located underneath.

In the frame 9 travels a slide 18 back and forth in guides 16 and 17. The slide has a slot 19; in this slides the die-block 20 which is engaged by a crank pin 21 of the revolving plate 6, which imparts the reciprocating motion to the slide.

Below the slide 18, on both sides, project bearing flanges 22 with pins 23 to which is linked the file-holder 24. The latter forms a double-armed lever whose front arm carries the file 25, the shank of which is fixed in a bushing 26 (Figs. 19 and 20) which can be removed together with the file, while the front end is held by an interchangeable chuck 27, whose interior cross-section is similar to the cross-section of the file. Bushing 26 and chuck 27 are adjustable and capable of being secured in definite positions by means of hand-screws 28. Once chuck 27 is definitely adjusted, the file comes automatically into the correct working position, even if it is pulled out of the chuck and turned around its axis for the purpose of changing the working surfaces.

The rear arm of the file-holder includes a transverse follower plate 29, which bears against the periphery of the revolving plate 6. The latter is provided with a radial cam projection 30, through the pressure of which upon the follower plate 29, this plate and the corresponding arm of the file-holder, are lowered and thus in turn the file is raised. In the file-holder are fixed the screws 31 onto which the cross-bolt 32 is stuck loosely. Around both ends of the latter are wound helical springs 33. One end of each spring presses on the front arm of the file-holder, while the other pushes against the slide 18, so that the file is pressed downward and thus the follower plate 29 is pressed toward the periphery of the revolving plate 6. By means of nuts the tension of the spring and therefore the pressure on the file can be changed.

The pivotal axis of the file-holder lies deeper than the lower file-edge ever reaches, so that it is located underneath the toothing of the saw-blade to be sharpened.

The band-saw S to be sharpened is held fast between two gripping jaws 35 and 36, the one of which, 35, is firmly connected with the foundation plate 1, while the other, 36, is arranged movable and removable (see Figs. 16-18). The bottom of the latter bears against a nose 37 of the foundation plate 1, while its position as regards the fixed jaw 35 is determined by two protrusions 38 and 39 of this jaw. A spring 40 presses the movable jaw against the fixed one.

As presser for the saw-blade S, there is used a roller 41 (Figs. 3 and 16) placed between the jaws 35 and 36 and fixed to a screw-spindle 42, which is arranged slidably but not rotatably between the two jaws. By turning the unslidable nut 43, the roller 41 therefore can be adjusted in height and suited in position to saw-blades of various widths.

The movable jaw 36 is provided with a lateral arm 44 whose free end bears against a wedge-shaped key 45, due to the pressure of spring 40. The other side of this key leans against a fixed stop 46 which is connected with the foundation plate 1. The key 45 is attached to the free end of an elastic connecting rod 47 whose other end is linked to a rocking lever 48. This lever is pivoted upon the pin 49 firmly fixed in the upright 2, and its upper curved end 50 is held in contact with the rear side of the rotary cam plate 6 by means of the spring 51. On this rear side of the cam plate there is provided an axial cam projection 52, into whose path protrudes the curved end 50 of the rocking lever 48 so that the latter, when struck by the cam, is forced rearwardly, together with the connecting rod 47.

The manner of operation of the machine is as follows:

The saw-blade is inserted between the jaws 35, 36 in such a way that the breast-edges 53 of the teeth (Fig. 21) face the upright 2. By means of the hand-crank 5 the revolving plate 6 is then made to turn in the direction of the arrow in Fig. 4. Through this the slide 18, through the medium of the crank elements 19, 20, 21, and consequently the file 25, are brought into reciprocation. At position 1 (Fig. 4) of the crankpin 21 the file is in its lowermost position; by the springs 33 it is pressed into the tooth-space. The nose 10 of the frame 9 bears against the edge 13; the upper end 50 of the rocking lever 48 bears against the rear surface of the rotary cam plate 6; the gripping jaws 35 and 36 are closed and the saw-blade thus is held fast. This position of the parts is represented in Figs. 3, 4 and 5. When the cam plate is turned farther in the direction of the arrow, the file executes its working stroke. Toward the finish of this stroke the radial cam projection 30 of the rotary plate begins to bear against the follower plate 29 of the file-holder, so that this follower plate is pressed down and the file lifted up out of the tooth-space (position Fig. 6, crank-pin position II, Fig. 4). In consequence of the position of the fulcrum pins 23 of the file-holder at a lower level than the teeth of the saw-blade, the file, during this lifting-out, moves away from the tooth-point located before it, so that this point cannot be injured. After the file is lifted out completely, the arc-shaped rib 14 on the front side of the revolving plate contacts with the nose 10 of the frame 9, in consequence of which, the latter, together with the slide 18 and the file, are pushed to the front, the frame at the same time swinging on its spindles 8. Through this, the file, moving on up over the next tooth-point, comes to stand over the next tooth-space (see position Fig. 7, crank-pin position III, Fig. 4). In this advanced position, the file then executes its return stroke, simultaneously—first without touching the tooth—slowly lowering itself into the tooth-space, corresponding to the gradual slide-off of the radial cam projection 30 of the rotary cam plate. In the vicinity of the right-side dead point, approximately at position IV (Fig. 4) of the crank-pin, this lowering-down reaches its end, as represented in Fig. 8. Now, at position V (Fig. 10) of the crank-pin, the axial cam 52 provided on the back side of the rotary cam plate 6 begins to contact with the upper end 50 of the rocking lever 48. Through this, the connecting rod 47 is drawn back (Fig. 9); and its wedge-shaped end or key 43 slides along the fixed stop 46 and by it is pushed off to the right (Fig. 18). In this manner the arm 44 of the movable gripping jaw is likewise pushed to the right and is thus compelled to turn around its lower, horizontal, longitudinal edge, as the nose 37 of the foundation plate hinders its travel. Through this the gripping jaws open and release the saw-blade (Figs. 11 and 17). Shortly after the opening of the gripping jaws, the end of the arc-shaped rib 14 of the rotary cam plate passes by the nose 10 of the frame 9, so that this nose, under the influence of the tension-spring 12, falls into depression 15 of the revolving plate, the frame 9 swings backward on the spindles 8, and the file is drawn back. Thereby the file exercises a pressure on the inclined back-edge 54 (Fig. 21, II) of the saw-tooth, which pressure,— in consequence of the pivotal axis of the file-holder being located underneath the teeth,— is directed obliquely downward. Due to this circumstance, and because the gripping jaws are still open, the file is prevented from sliding, against the forward pressure of the springs 33, back over the inclined back-edge of the tooth located behind it, without taking same along. Instead, the saw is also drawn back and thus fed forward, considering its direction of travel, to the extent of one tooth. This position is illustrated in Fig. 12 and by the crank-pin position VI, Fig. 10. Here the file is taken back a little farther than corresponds to its working position. After the depression 15 of the rotary cam plate has passed by the nose 10 of the frame, the latter is again pushed forward by the elevated edge 13 of the plate, into the position for the working stroke, as represented in Fig. 3. This arrangement has the purpose of making the machine applicable, without any change, for different tooth-pitches of the blade to be sharpened. If, for instance, the tooth-pitch is greater than the file-advancement caused by the rib 14 of the revolving plate, there remains a certain distance between the front file-surface and the breast-edge of the tooth located before it, after the lowering-in of the file (see position Figs. 8 and 12, also Fig. 21, II). Now, if the file were drawn back only up to the working position, this distance would remain unchanged and the file would not touch this breast-edge in its working stroke. Owing to the provision of the depression 15 of the rotary cam plate, however, the file goes back farther than corresponds to its working position; but in the readvancement of the file the saw-blade first remains motionless until the distance (Fig. 21, III) between the breast-edge of the tooth and the file has been covered, so that file and saw-blade again come into the correct relative position for the working stroke. After this readvancement into position (Fig. 3) is accomplished, the axial cam 52 runs off the end 50 of the rocking lever 38, so that the latter is pushed to the front by the spring 51, together with the connecting rod 47 and the key attached thereto, and the gripping jaw 35 is closed again through the pressure of the spring 40. In the right-side dead point of the crank-pin (I, Fig. 4) this closing is finished, so that the play with a new working stroke can begin all over again.

As is evident, the feeding of the saw-blade takes place in the direction in which it moves when sawing; with the breast-edge forward, so that the teeth are sharpened in the order in which they attack the wood when sawing. Consequently, each tooth is sharpened on the breast-edge first, and on the back-edge only at the next working stroke of the file. This, however, demands that the feed-pressure of the file must be directed against the inclined back-edge of the tooth, instead of against the steep breast-edge, as is the case in the reversed feed-direction as used up to now. But in order that the file, when going back, may not simply slide up over the inclined back-edge of the tooth without taking the saw along, the gripping jaws are opened for the saw during the feed-motion, and the bearing-pins 23 of the file-holder, as already mentioned, lie at a lower level than the teeth of the saw, so that the pressure (draw) at the file is directed obliquely downward. This makes the feeding in the direction of the working motion of the saw-blade a possibility. But this feeding produces a considerably better sharpening of the saw than the reversed one, for, if there is first sharpened the breast-edge and only then the back-edge, the bur (the so-called "lint") which forms at the point of the tooth during the sharpening is directed forward. Owing to this the saw cuts considerably better than in the reversed case, in which, as is said in professional parlance, the saw "has no 'spunk'". Therefore, when filing by hand, the sharpening of the teeth is always done in this order, while the machines so far known are made to work in the reversed feeding direction.

The frame-shaped form of the moving parts 9 and 18 makes possible their easy movability and therefore only a small requirement of power for the machine.

In the modification represented in Fig. 22, the machine is built for power drive, there being used a pulley 55 for power transmission. In order to automatically stop the drive as soon as all the teeth of the band-saw S (representing an endless band) are sharpened, the following arrangement has been made.

The hub of the pulley 55 fitting loose on the shaft 4 forms one element 56 of a disengageable clutch-coupling, whose other element is keyed onto the shaft 4. The disengaging lever 59 which is pivoted upon the pin 58 of the upright 2, rests, in case of engaged coupling, with its lower arm up against the end 60 of the bell-crank lever 61, onto which it is drawn by a spring 62. The lever 61 is connected, by means of the connecting rod 63, with the lever 64 which is linked to the fixed gripping jaw. The rider 65 is destined to be set astride the band-saw S so far as to fit into the tooth-space thereof located close by the follower plate 29, at the beginning of the sharpening, after this space has passed by the file. Thus, this rider takes part in the complete revolution of the saw-blade through the feeding. As soon as it comes on its way from the left to the lever 64, it takes along the upper arm of the same, in consequence of which the connecting rod 63 is drawn to the left, the horizontal arm of the bell-crank lever 61 is lowered, and the lower arm of the disengaging lever 59 is released, so that, under the influence of the spring 62, it is drawn to the left, owing to which the clutch-coupling 56, 57 is disengaged and the drive stopped (position as shown).

The saw may be said to move forward when sawing, so the word "forward", as used in the following claims, is to be considered to relate to that particular direction of movement.

Having thus described the invention, what I claim and desire to secure by Letters Patent is:

1. In a band-saw sharpening machine, the combination of a saw holder in which the saw is held to slide longitudinally and is sustained against inward pressure upon its teeth, a file holder mounted for transverse reciprocation with respect to the saw and adapted to position the file carried thereby so that it will contact with both the front and back edges of adjacent saw teeth during the working stroke, means for reciprocating the file holder, means for moving the file holder and its file outward from the saw and clear of its teeth at the end of the working stroke and for moving the same toward the saw as the end of the return stroke is approached, and means for moving the said file holder and file rearward with respect to the saw to the extent of the space between teeth at the end of the working stroke and for moving the same in the reverse direction and pressing the same inward against the saw before the beginning of the next succeeding working stroke.

2. In a band-saw sharpening machine, the combination of a saw holder having releasable jaws adapted to grip the saw when closed and to permit longitudinal sliding movement of the same when open, a file holder mounted for transverse reciprocation with respect to the saw and adapted to position the file carried thereby so that it will contact with both the front and back edges of adjacent saw teeth during its working stroke, means for reciprocating the file holder, means for moving the file holder and its file outward from the saw and clear of its teeth at the end of the working stroke and for moving the same toward the saw as the end of the return stroke is approached, means for moving the said file holder and file rearward with respect to the saw to the extent of the space between teeth at the end of the working stroke and for moving the same in the reverse direction and pressing the same inward against the saw before the beginning of the next succeeding working stroke, and means for opening the jaws of the saw holder just before the forward, saw-feeding movement of the file holder and for closing the jaws again at the end of the said feeding movement and before the next working stroke.

3. In a band-saw sharpening machine, the combination of a saw holder having releasable jaws adapted to grip the saw when closed and to permit longitudinal sliding movement of the same when open, a file holder mounted for transverse reciprocation with respect to the saw and adapted to position the file carried thereby so that it will contact with both the front and back edges of adjacent saw teeth during its working stroke, means for reciprocating the file holder, means for moving the file holder and its file outward from the saw and clear of its teeth at the end of the working stroke and for moving the same toward the saw as the end of the return stroke is approached, means for moving the said file holder and file rearward with respect to the saw to the extent of the space between teeth at the end of the working stroke and for moving the same in the reverse direction and pressing the same inward against the saw before the beginning of the next succeeding stroke, means for opening the jaws of the saw holder just before the forward, saw-feeding movement of the file holder and for closing the jaws again at the end of the said feeding movement and before the next working stroke, and means provided in conjunction with the said jaws for sustaining the saw against inward pressure upon its teeth irrespective of the relative position of the jaws.

4. In a band-saw sharpening machine, the combination of a saw holder having releasable jaws adapted to grip the saw when closed and to permit longitudinal sliding movement of the same when open, a file holder mounted for transverse reciprocation with respect to the saw and adapted to position the file carried thereby so that it will contact with both the front and back edges of adjacent saw teeth during its working stroke, means for reciprocating the file-holder, means for moving the file holder and its file outward from the saw and clear of its teeth at the end of the working stroke and for moving the same toward the saw as the end of the return stroke is approached, means for moving the said file holder and file rearward with respect to the saw to the extent of the space between teeth at the end of the working stroke and for moving the same in the reverse direction and pressing the same inward against the saw before the beginning of the next succeeding working stroke, means for opening the jaws of the saw holder just before the forward, saw-feeding movement of the file holder and for releasing the jaws again at the end of the said feeding movement and before the next working stroke, and yieldable means tending normally to close the jaws.

5. In a band-saw sharpening machine, the combination of a saw-holder, including relatively adjustable gripping jaws, a saw-sustaining device including a longitudinally adjustable, threaded spindle, mounted between the said jaws, and an adjusting nut mounted for rotation only in the saw holder and engaged with the threads of the said spindle, a file holder mounted for movement against the saw teeth, and means for operating the said file holder.

6. In a band-saw sharpening machine, a saw holder in which the saw is held to slide longitudinally and which includes saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking member pivoted to the slide on an axis parallel to the frame axis, means for reciprocating the slide, means for rocking the file holder during the reciprocation of the slide so as to move the file carried thereby outward from the saw and clear of its teeth at the end of the working stroke and to move the file toward the saw as the end of the return stroke is approached, and means for swinging the said frame so as to move the file holder and its file rearward with respect to the saw to the extent of the space between teeth at the end of the working stroke and to move the same in the reverse direction before the beginning of the next succeeding working stroke, the pivotal axis of the file holder being situated so that it will normally be disposed inwardly of the saw teeth.

7. In a band-saw sharpening machine, a saw holder in which the saw is held to slide longitudinally and which includes adjustable saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking member pivoted to the slide, on an axis parallel to the frame axis, means for reciprocating the slide, means for rocking the file holder during the reciprocation of the slide so as to move the file carried thereby outward from the saw and clear of its teeth at the end of the working and to move the file toward the saw as the end of the return stroke is approached, and means for swinging the said frame so as to move the file holder and its file rearward with respect to the saw to the extent of the space between teeth at the end of the working stroke and to move the same in the reverse direction before the beginning of the next succeeding working stroke, the saw-sustaining means of the saw holder being adapted to be adjusted so that the teeth of any saw engaged with the saw holder will be disposed outwardly of the pivotal axis of the file holder.

8. In a band-saw sharpening machine, a saw holder in which the saw is held to slide longitudinally and which includes saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking lever pivoted to the slide on an axis parallel to the frame axis and situated inward of the normal position of the teeth of a saw engaged with the saw holder, a rotatable actuating member having a crank-pin connection with the said slide to reciprocate the same, the said actuating member having a cam surface for contact with an arm of the file holder, which cam surface is formed and timed with relation to the slide-operating crank-pin so that the file holder and its file will be moved outward from the saw and clear of its teeth at the end of the working stroke and will be moved toward the saw as the end of the return stroke is approached, the actuating member being provided with a second cam surface for contact with the swinging frame and so formed and timed that it will move the file holder and its file rearward with respect to the saw to the extent of the space between teeth at the end of the working stroke and will move the same in the reverse direction before the beginning of the next succeeding working stroke, and means for rotating the actuating member.

9. In a band-saw sharpening machine, a saw holder in which the saw is held to slide longitudinally and which includes saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking lever pivoted to the slide on an axis parallel to the frame axis and situated inward of the normal position of the teeth of a saw engaged with the saw holder, a rotatable actuating member having a crank-pin connection with the said slide to reciprocate the same, the said actuating member having a cam surface for contact with an arm of the file holder, which cam surface is formed and timed with relation to the slide-operating crank-pin so that the file holder and its file will be moved outward from the saw and clear of its teeth at the end of the working stroke and will be moved toward the saw as the end of the return stroke is approached, the actuating member being provided with a second cam surface for contact with the swinging frame and so formed and timed that it will move the file holder and file rearward with respect to the saw to the extent of the space between teeth at the end of the working stroke and will move the same in the reverse direction before the beginning of the next succeeding working stroke, means for rotating the actuating member, the saw holder being comprised of relatively adjustable gripping jaws, and operating means for the said jaws including a movable member, the actuating member being provided with a third cam surface for contact with the said movable member which is formed and timed so that the jaws will be opened just before the forward saw-feeding movement of the file holder and will be closed again at the end of the said feeding movement and before the next working stroke.

10. In a band-saw sharpening machine, a saw holder in which the saw is held to slide longitudinally and which includes saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking lever pivoted to the slide on an axis parallel to the frame axis and situated inward of the normal position of the teeth of a saw engaged with the saw holder, a rotatable actuating member having a crank-pin connection with the said slide to reciprocate the same, the said actuating member having a cam surface for contact with an arm of the file holder, which cam surface is formed and timed with relation to the slide-operating crank-pin so that the file holder and its file will be moved outward from the saw and clear of its teeth at the end of the working stroke and will be moved toward the saw as the end of the return stroke is approached, the actuating member being provided with a second cam surface for contact with the swinging frame and so formed and timed that it will move the file holder and file rearward with respect to the saw to the extent of the space between teeth at the end of the working stroke and will move the same in the reverse direction before the beginning of the next succeeding working stroke, means for rotating the actuating member, the saw holder being comprised of relatively adjustable gripping jaws, operating means for the said jaws including a movable member, the actuating member being provided with a third cam surface for contact with the said movable member which is formed and timed so that the jaws will be opened just before the forward saw-feeding movement of the file holder and will be closed again at the end of the said feeding movement and before the next working stroke, and yieldable means for pressing the parts which contact with the said cam surfaces of the actuating member against the same.

11. In a band-saw sharpening machine, a saw holder in which the saw is held to slide longitudinally and which includes saw-sustaining means adapted to resist inward pressure upon the saw teeth, a frame mounted to swing on an axis disposed transverse to the path of movement of the saw, a slide mounted on the said frame for reciprocation in a direction parallel to the frame axis, a file holder in the form of a rocking lever pivoted to the slide on an axis parallel to the frame axis and situated inward of the normal position of the teeth of a saw engaged with the saw holder, a rotatable actuating member having a crank-pin connection with the said slide to reciprocate the same, the said actuating member having a cam surface for contact with an arm of the file holder, which cam surface is formed and timed with relation to the slide-operating crank-pin so that the file holder and its file will be moved outward from the saw and clear of its teeth at the end of the working stroke and will be moved toward the saw as the end of the return stroke is approached, the actuating member being provided with a second cam surface for contact with the swinging frame and so formed and timed that it will move the file holder and its file rearward with respect to the saw to the extent of the space between teeth at the end of the working stroke and will move the same in the reverse direction before the beginning of the next succeeding working stroke, means for rotating the actuating member, the actuating member having an indentation in the second named cam surface disposed so that the part of the swinging frame that contacts with the said surface may move into the same at the end of the forward, saw-feeding movement of the said swinging member to move the frame forward with respect to the saw a little farther than the working position of the file and then to return it to working position.

12. In a band-saw sharpening machine, the combination with a saw holder in which the saw is held to slide longitudinally, a movable saw sharpening member, and a disengageable drive for the sharpening member, of shifting means for the said drive including a trip device positioned contiguous to the saw path so that it will be actuated by a rider carried by the saw to stop the sharpening member when the saw has advanced a predetermined distance.

13. In a band-saw sharpening machine, the combination with a saw holder in which the saw is held to slide longitudinally, a movable saw sharpening member and driving means for the said sharpening member, including driving and driven elements and a spring-actuated clutch-coupling therefor having a shifting lever, of automatic operating means for the said shifting lever comprising a pawl adapted normally to engage the said lever and secure it in closed-clutch position, a trip lever disposed contiguous to the path of the saw so that it will be actuated by a rider carried by the saw, and means for connecting the trip lever with the said pawl so that actuation of the lever will release the pawl and trip the clutch-shifting lever.

14. In a band-saw sharpening machine, a saw holder in which the saw is held to slide longitudinally and which includes saw-sustaining means adapted to resist inward pressure upon the saw teeth, and saw-feeding means including a pivotal member adapted to engage the saw teeth, a support on which the said member is pivoted, and means for swinging the said member intermittently on its pivot to clear the saw teeth and for moving the said support back and forth along the path of movement of the saw alternately as the said pivoted member is in and out of engagement with the saw.

In testimony whereof I have signed my name to this specification in the presence of two subscribing witnesses.

ALFRED WEISS.

Witnesses:
 E. FURNEN-FELLY,
 CARL GNABER.

Copies of this patent may be obtained for five cents each, by addressing the "Commissioner of Patents, Washington, D. C."